United States Patent [19]

Peniston et al.

[11] 4,199,496

[45] Apr. 22, 1980

[54] PROCESS FOR THE RECOVERY OF CHEMICALS FROM THE SHELLS OF CRUSTACEA

[76] Inventors: Quintin P. Peniston; Edwin L. Johnson, both of 4900 9th Ave. NW., Seattle, Wash. 98107

[21] Appl. No.: 565,849

[22] Filed: Apr. 7, 1975

Related U.S. Application Data

[63] Continuation-in-part of Ser. No. 829,154, May 6, 1969, abandoned, and a continuation-in-part of Ser. No. 503,268, Sep. 5, 1974, abandoned.

[51] Int. Cl.² ............................................... A23J 1/04
[52] U.S. Cl. ................................................. 260/112 R
[58] Field of Search ............... 260/112 R, 122, 211 R; 423/173

[56] References Cited

U.S. PATENT DOCUMENTS

| | | | |
|---|---|---|---|
| 1,138,348 | 5/1915 | Bohon | 260/112 R |
| 1,896,403 | 2/1933 | Haden | 423/173 |
| 2,080,883 | 5/1937 | Wood | 423/173 |
| 2,097,979 | 11/1937 | Horton | 423/173 |
| 2,602,031 | 7/1952 | Ugelstad | 260/6 |
| 2,875,061 | 2/1959 | Vogel | 260/112 R |
| 3,598,606 | 8/1971 | Spinelli | 260/112 R |
| 3,852,486 | 12/1974 | Walker | 426/129 |

OTHER PUBLICATIONS

Max Lafon, "Nouvelles Recherches Biochimiques et Physiologiques sur le Squellette Tegumentaire des Crustaces", Bull. Inst. Oceanographique, 45, No. 939, Oct. 5, 1948.

*Primary Examiner*—Paul R. Michl

[57] ABSTRACT

A process is described for extraction and recovery of chemicals from the shell of various crustacea species. Significant features of the process are determination and use of conditions for extraction which are sufficient to liberate protein from its combination with chitin in the shell matrix and to dissolve it as an alkali proteinate solution while causing minimum alteration to the protein so that products of high nutritional quality can be obtained; the conditions for the extraction of the chitin from the shell matrix and in a useful form; and, the recovery of a calcium compound from the shell matrix.

27 Claims, 4 Drawing Figures

FOUR STAGE REPRESENTATION OF EXTRACTION PROCESS

PROCESS FOR THE RECOVERY OF CHEMICALS FROM THE SHELLS OF CRUSTACEA

This application is a continuation-in-part application of a previous application, Ser. No. 829,154, filing date of May 6, 1969, now abandoned, and a previous application, Ser. No. 503,268, filing date of Sept. 5, 1974 now abandoned.

THE BACKGROUND OF THE INVENTION

The world production of shellfish of various crustacea species including crab, shrimp, prawns, crayfish and lobsters has increased enormously in recent years. In general, only a small portion, 20-30 percent, of the live weight of these crustacea species is considered suitable for human food, namely the fleshy tissue found in portions of the body and major appendages. The balance, comprising viscera, and the exoskeleton or "shell" is usually discarded as waste although in some instances it is dried, ground and marketed as "shellfish meal" for use as animal feed or fertilizer.

An indication of the shellfish production in a few countries of the world is indicated in the following TABLE I.

TABLE I
SOME SHELLFISH PRODUCTION DATA - 1968

| Country | Species | Live Weight Millions of Pounds |
| --- | --- | --- |
| Alaska | King Crab | 30 |
|  | Tanner Crab | 7 |
|  | Dungeness Crab | 20 |
|  | Shrimp | 30 |
| U.S. (landings) | Shrimp | 300 |
| (imports) | Shrimp | 350 |
| (landings) | Dungeness Crab | 20 |
| (landings) | Blue Crab | 40 |
| (landings) | Northern Lobster | 48 |
| Canada (landings) | Northern Lobster | 37 |
| Mexico (U.S. Imports) | Shrimp | 84 |
| India (U.S. Imports) | Shrimp | 37 |
| South Africa (U.S. Imports) | Spiny Lobster | 32 |
| Australia (U.S. Imports) | Spiny Lobster | 29 |

The concerned species of crustacea have a number of common characteristics and common problems. For examply, the edible portion of crustacea is normally 20-30 percent of the live weight with the rest of the shellfish of crustacea being waste. While the edible portion of the shellfish and in some instances, partially processed products, e.g., "heads-off" shrimp, lobster tails, King crab leg-in-shell sections, etc., command good prices with firm demand in the world markets, the recovery of the waste has been uneconomical, or, at best, marginal for only a small portion of the available tonnage of waste. As a result, wastes are often dumped into waterways adjacent to the processing plants; and, in localities where a concentration of processing activity occurs, serious pollution problems prevail with an increase in the bacteria count of the adjacent waterways.

One example of a major shellfish waste pollution situation is found in Kodiak, Alaska. Here, about 60% of the shellfish industry of Alaska is concentrated with the annual catch figures, in live weight, as indicated in the following TABLE II:

TABLE II
SHELLFISH CATCH IN POUNDS

| King crab | 40-60 | million pounds |
| --- | --- | --- |
| Other crab species | 20-30 | million pounds |
| Shrimp | 20-30 | million pounds |
| Total catch | 80-120 | million pounds |
| Waste | 50-70 | million pounds |

There are approximately fifteen processing plants in the Kodiak, Alaska, area. No attempt is made to recover the shellfish waste of crustacea and these wastes are dumped into the harbor adjacent to the processing plants. As a result, there is pollution of the water in the harbor. This pollution is a nuisance to the community and a hazard to the industry itself through the growth of bacteria in the harbor waters, and, also, in the live tanks.

In some of the fisheries centers there is produced shellfish meal from the shellfish waste of crustacea. In general, shellfish waste meals have limited markets due to their high mineral and chitin content. This limits levels at which the shellfish waste meals can be fed to farm animals and to poultry. In the Kodiak area in particular, it has not been economical to process the shellfish waste. There is a lack of local markets for the feed materials and the high freight costs to potential consuming areas makes it uneconomical to process shellfish waste of crustacea into shellfish waste meal.

Markets for "shellfish meal" are marginal since the crude product has intrinsic properties which limit its value. The exoskeleton of the shell of crustacea, usually amounting to 40-60 percent of the waste is about half mineral matter (calcium carbonate with some calcium phosphate), the remainder being chitin and protein. Chitin is indigestible for poultry and livestock and can cause intestinal irritation. Thus, only the protein is of real value as a feed material and the other components of shellfish meal are undesirable diluents detracting from the feed value.

As a result of this background, a study was made of the possibility of processing crustacea waste. From this study this invention and process has been made.

If the waste can be separated into its components, mineral matter, chitin, protein and carotenoid pigments of considerably greater value can be recovered. Chitin is a source of valuable polymeric carbohydrate material having many potential uses and the protein of the exoskeleton of crustacea is of high nutritional quality having a good balance of essential amino acids. In this manner it is different in character from the collagen, keratin and gelatin usually found in animal waste products.

While a minor portion of the protein in crustacea waste is unremoved flesh and visceral material, the major part is protein laid down with chitin and mineral matter in the formation of the exoskeleton. This is largely chemically bound to the chitin and sometimes to carotenoid pigments.

In crustacea, the shell comprise a matrix of protein chemically combined with chitin mixed with calcium carbonate. The protein is not free or readily available. In order to remove the protein, the shell of the crustacea is treated with an alkaline aqueous solution to penetrate the interstices of the shell matrix to rupture the bond between protein and chitin. The protein is dissolved in the alkaline aqueous solution. In the crustacea waste there is some free protein occluded on the shell, but most of the free protein in the crustacea waste has been removed by washing. The major portion of the protein is bound within the shell matrix.

A more detailed resumé of the crustacea exoskeleton is presented in *The Physiology of Crustacea*, edited by Talbot H. Waterman, Department of Zoology, Yale University, Volume 1, "Metabolism and Growth", Academic Press, New York and London, 1960, and, in particular, on page 449 wherein it is stated:

"INTEGUMENT AND EXOSKELETON

"I. INTRODUCTION"

"An up-to-date definition of the arthropod exoskeleton might be that it consists basically of a chitin protein structure secreted over the whole body surface by an epidermis consisting of a single layer of cells. The chitin is of the a-type, and the protein is not collagen. But only rarely does the cuticle comprising the exoskeleton remain as simple as this. It is usually stiffened and hardened over most of the surface of the body by the deposition of calcium salts or of further organic material laid down in a complex manner involving tanning due to interaction between proteins and quinones. To define the arthropod exoskeleton simply as a chitinous structure places undue emphasis on the presence of a substance which is not confined solely to arthropods. Chitin is found in the Coelenterata, Annelida, Mollusca, and Brachiopoda, but here, however, it is of the B-type. A further point of distinction is that in Arthropoda chitin is spead continuously over the whole body surface and not restricted to specialized areas."

and further, on pages 463 and 464 wherein it is stated:

"B. MOLECULAR CONSTITUENTS AND ORGANIZATION

"Widely recognized molecular constituents of crustacean cuticles are chitin and calcium carbonate. A valuable and full discussion of chitin and its derivatives has been given by Richards, who defines chitin as 'a high molecular weight polymer of anhydro-N-acetylglucosamine residues joined by ether linkages of the $\beta$-glycosidic type between carbon atoms 1 and 4 of adjacent residues. The molecular chains are very long, seemingly at least several hundreds of the N-acetylglucosamine residues linked together into one long molecular, and, as far as known, show no branching.'

"The chains formed in this way constitute microfibers which are perhaps those visualized by the electron microscope. Larger fibers seen with the light microscope may represent bundles of the microfibers held together by lateral linkages, but as yet the relation between the two kinds of fibers is not clear. The chitin content of the calcified cuticle of Decapoda amounts to about 60-80% of the dry weight of the organic fraction of the cuticle. As a result of the regular orientation of chitin micellas, the cuticle shows varying degrees of birefringence.

"Calcium carbonate, the other well-known constituents, may account for a considerable proportion of the dry weight of the crustacean exoskeleton. It occurs mainly as calcite, in either a micro- or macro-crystalline condition, although amorphous $CaCO_3$ is sometimes found. There is a considerable literature relating to the calcification of the cuticle and on the occurrence in it of magnesium, phosphorus, and sulfur.

"Like phenolic tanning, calcification of the cuticle of Decapoda proceeds from outside inward. The epicuticle is calcified first and the process then spreads to successive laminae of the endocuticle. The interprismatic spaces, occupied by material like that of the eipcuticle, seem to play an important part in calcification; crystallization starts within them and spreads out horizontally. This may be because the spaces form a pathway for the transport of calcium. Whether this is so or not, it is a fact that the mosaic formed by crystallization does not correspond with the one formed by the 'réseau' of interprismatic spaces (see FIGS. 21 and 22 in reference).

"A third important cuticular component, its protein content, has received much less attention than chitin and $CaCO_3$. Its presence was implied when the isoelectric points of the layers of the soft cuticle of the fore-gut of *Homarus* were determined. However, no specific reference to protein was made in this work. The scanty information we have comes cheifly from analyses of exoskeleton of *Homarus* as well as from various insects. After extraction with water the protein remaining in the cuticle is probably firmly bound to the chitin, the linkages involved being at least as strong as those between the amino acids of the protein. *Homarus* cuticular protein contain serine, alanine, threonine, tyrosine, and tryptophan, but no glycine. Presumably other amino acids are present. Quantitative analyses of the protein and chitin in the exoskeletons of *Homarus gammarus, Carcinus, Maenas, Galathea squamifera, Crangon Crangon,* and *Ligia oceanica* have also, been made. Obviously much further work on the proteins and amino acids of crustacean cuticles is desirable."

Another reference to the shell of crustacea is in Waldo L. Schmitt's book, *CRUSTACEANS*, Ann Arbor, The University of Michigan Press, 1965, wherein on page 21 it is stated:

"The factor that cells attention to the segmentation of the shrimp or lobster body is the hard shell covering of each ring or somite. Such shelly rings (FIG. 6) overlap and make an external skeleton—exoskeleton—for the crustacean like a suit of jointed armor, headpiece and all. But, though jointed, the rings are really continuous over the entire body, including the limbs. This body covering or cuticle is made of a chitin-protein substance (from here on referred to simply as chitin). At the joints it is thin and soft, permitting the parts to move upon one another, but elsewhere it is hardened by the deposition of carbonate and other salts of lime. Though the somites can move backwards and forwards upon one another they cannot move laterally, because the soft joints are interrupted at the sides by interlocking hinge joints—a fact which prevents a lobster from swimming in any other direction than forward or backward."

Max Lafon, "Nouvelles Recherches Biochimiques et Physiologiques sur le squellette tegumentaire des Crustaces", Bull. Inst. Oceanographique 45 No. 939, Oct. 5, 1948, demonstrated that there are two protein types in the integument of crustacea differing primarily in their solubility characteritics. His procedures for extraction of these proteins were as follows:

The integument is carefully freed of the hypodermal layer by scraping, then rapidly washed, dried and ground to very small fragments, dried and weighed. It is then demineralized by treatment for 24 hours in the cold with 2% HCl. (It is shown that the proteins are unaltered by this treatment).

After demineralization, the hydrochloric acid solution is removed by filtration, the organic matter is washed twice rapidly and the wash waters are removed (loss of protein is insignificant as shown in comparative tests).

The demineralized integument in next extracted with a buffer solution at pH 9.2 consisting of borax solution (19 g/l.), 5 parts; water, 5 parts; 95% ethanol, 4 parts; ether, 1 part for 36 hours at 55° C. This treatment had previously been found adequate to completely extract the more soluble protein called arthropodine by Trim, A. R. Trim, "Biochemical Journal", 35, 1088–98 (1941). The extract was analyzed for total nitrogen by a micro Kjeldahl procedure.

The residue was next extracted with 5% sodium hydroxide solution for 5 hours at 55° C. and then 1 hour at 100° C. This removed all of the more difficulty soluble protein leaving essentially pure chitin as a final residue. The extract and the residue were also analyzed for total nitrogen by the micro Kjeldahl procedure.

Three nitrogen values were thus obtained representing: A, the more soluble protein arthropodine; B, the difficultly soluble protein; and C, the residual chitin. Values of A, B, A+B, C, A/B and A +B/C were tabulated for integuments of several crustacea species.

*The values of W, the weight ratio of total protein to chitin, are calculated from Lafon's values for the nitrogen contents of protein and chitin, these being 15% and 6.5%, respectively.

The data indicate that the more soluble protein, arthropodine predominates in uncalcified integument but becomes much less on calcification.

Ratios of the two proteins are in fair agreement with present values indicated by extraction rate experiments.

It should be recognized that Lafon's extraction medium for the more soluble protein was intended for research purposes and is not practical for a commercial process. Also, his use of 5% sodium hydroxide at 100° is too drastic for production of a protein of good nutritional value.

TABLE III

ORGANIC MATTER IN THE INTEGUMENTS OF SEVERAL CRUSTACEA

| | Percentages of the Total Nitrogen | | | | | | W* |
|---|---|---|---|---|---|---|---|
| | A | B | A + B | C | A/B | A + B/C | |
| Non Calcifiable Integuments | | | | | | | |
| *Homarus gamarus* (lobster) membraneous layers | 30.9 | 11.2 | 42.1 | 57.9 | 2.75 | 0.72 | 0.30 |
| *Eupagurus bernhardus* (hermit crab) abdominal integument | 49.7 | 22.6 | 72.3 | 27.7 | 2.20 | 2.61 | 1.07 |
| *Carcinides maenas* (green crab) intersegmental integument | 43.5 | 17.3 | 60.8 | 39.2 | 2.51 | 1.55 | 0.62 |
| Calcifiable Integuments | | | | | | | |
| *Homarus gamarus* calcified layers of shield | 14.7 | 15.3 | 30.0 | 70.0 | 0.95 | 0.43 | 0.18 |
| *Galathea squamifera* (barnacle) | 15.9 | 29.8 | 45.7 | 54.3 | 0.53 | 0.84 | 0.35 |
| *Eupagurus bernhardus* pinchers, legs, thorax | 12.2 | 39.9 | 52.1 | 47.9 | 0.31 | 1.08 | 0.45 |
| *Carcinides maenas* carapace | 10.1 | 27.4 | 37.5 | 62.5 | 0.37 | 0.60 | 0.25 |
| *Crangon crangon* (shrimp) shield and abdom., integ. | 20.1 | 31.9 | 52.0 | 48.0 | 0.63 | 1.08 | 0.45 |
| *Lygia oceanica* (isopod) abdominal integ. | 18.6 | 41.3 | 59.9 | 40.1 | 0.45 | 1.49 | 0.62 |

Historically, chitan has been isolated from crustacea shell by boiling the shell with strong caustic alkali solutions to remove protein and dissolving away the mineral matter with strong mineral acid, usually hydrochloric acid. While these treatments are effective in removing protein and mineral matter, the protein suffers deep seated changes in the process. Not only are bonds between chitin and protein ruptured, but the protein itself undergoes substantial hydrolyses to polypeptide chains of reduced molecular size. Also, some of the essential amino acids are partially destroyed. For example, cystine is converted to lanthionine of no nutritional value and lysine to lysinoalinine. The effect on lysine is generally much less than on cystine.

The reduced molecular size of the protein results in incomplete precipitation when the protein is brought to its isoelectric point since the small peptides remain soluble. The loss of cystine and lysine greatly reduces the nutritional value of the protein. Consequently, prior processes for chitin isolation have not attempted protein recovery. The dissolved protein has been discharged as a process effluent thus wasting a valuable resource and contributing materially to the pollution of receiving waters. Furthermore, the loss of a valuable by-product has increased the cost burden on chitin production making it too expensive for most industrial applications. It has not been economically practical to process the shell of crustacea to recover only chitin as the selling price is too great for the chitin to compete with other commercially available chemicals. By processing shell of crustacea to recover both the chitin and the protein in the matrix of chitin and protein in the shell then the cost of both the chitin and the protein will be sufficiently low to compete in the market place.

The shell of crustacea is different from fish waste. In the shell of crustacea the shell is an exoskeleton comprising a matrix of protein and chitin and a calcium compound whereas, in fish waste, the fish waste comprises protein but does not comprise chitin and does not comprise the calcium compound. Generally, in fish waste, there is no skeleton in the fish waste. The fish waste may be flesh, fish meal, offal such as viscera and the like. The chemical composition of the shell of crustacea is different from the chemical composition of fish waste as above illustrated.

THE GENERAL DESCRIPTION OF THE INVENTION

Separation of the protein from the solid shell matrix requires diffusion of a reagent capable of rupturing the bonds between protein and chitin through the interstices of the matrix, solution of the liberated protein in the reagent medium, and diffusion of the dissolved protein through the interstices to the main body of the extracting solution. If the protein is to retain its high nutritional quality, these steps must occur with minimal alteration to the protein structure.

We have found means whereby protein can be extracted from crustacea shells using more mild conditions thus minimizing alterations which detract from its nutritional value and permitting recovery in high yield. We have found that there are critical levels of hydroxyl ion activity and of temperature which suffice to free protein from its combination with chitin in the shell matrix and to solubilize it so that diffusion into the main body of the extracting solution can occur. Rates of extraction are improved by reducing the particle size of the shell fragments. Reduction to pass a 8–14 mesh per inch screen represents a practical balance between reducing interstitial path length for diffusion and loss of fines in the subsequent solid recovery steps. Countercurrent flow of the shell fragments and the aqueous extracting solution is employed in either continuous or batch multistage countercurrent treatment so that the incoming shell is subjected to the least drastic condition and the outgoing deproteinized shell, viz., the matrix comprising mainly chitin and protein and calcium carbonate has been treated to remove the protein so as to leave, mainly, chitin and calcium carbonate, is in contact with fresh aqueous extraction medium thereby obtaining substantially complete protein removal. The extracting reagent can be added incrementally throughout the process so that a minimum effective hydroxyl ion activity can be maintained at all stages of the process.

We have further found that the recovery of protein by neutralization to its iso-electric point is roughly proportional to the protein concentration. Countercurrent extraction realizes a maxiumu protein concentration in the aqueous effluent liquor and this a higher protein recovery. The solubility of protein in the aqueous mother liquor from the precipitation has been found to increase with the salt concentration. Thus, optimum protein recovery is attained with highest protein concentration and lowest excess of alkali in the aqueous extract liquor.

THE OBJECTS AND THE ADVANTAGES

An object and advantage of this invention is to provide a process for recovering protein, as a commercially useful material, from the shell of crustacea wherein the shell comprises a matrix of protein and chitin; a further object of this invention is to provide a process for recovering protein, as a commercially useful chemical, from the shell of crustacea; an additional object is to provide a process for recovering protein, at a low cost, from the shell of crustacea; another important object is to provide a process for recovering chitin, at a low cost, from the shell of crustacea; and, another valuable object of this invention is to provide a process wherein shellfish waste from crustacea can be economically processed into valuable chemicals so that it is more desirable to chemically process the shell of crustacea than to discard the shell of crustacea with resultant pollution such as to recover protein, chitin, and calcium chloride.

These and other important objects and advantages of the invention will be more particularly brought forth upon reference to the accompanying specific description of the invention, the appended claims and the drawings.

THE DRAWINGS

THE SPECIFIC DESCRIPTION OF THE INVENTION

Figure 1:
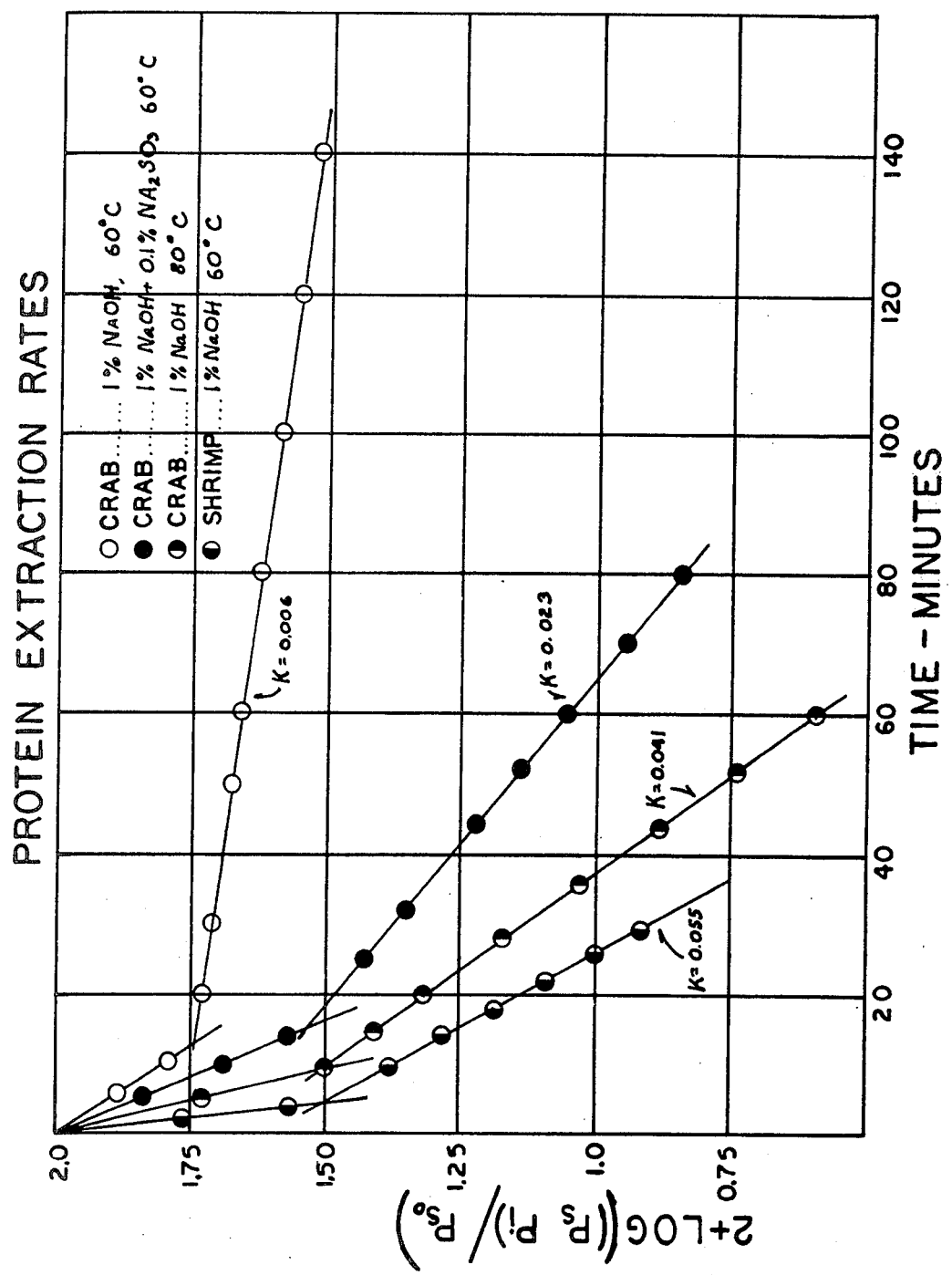
FIG. 1 is a graph and is entitled "Protein Extraction Rates"

An outline for the recovery of useful by-products from shellfish waste of crustacea includes the location of the recovery plant near a shellfish or crustacea processing plant. One of the ways of processing the shellfish waste is to wet grind the waste in a hammermill type equipment. The ground shellfish waste may be flumed to the processing recovery plant or truck hauled to the plant. The shellfish waste should be reduced to a size in the range of 0.05"–0.15" mean diameter with a minimum amount of fines. Also, considerable care should be taken to avoid bacteria spoilage and filth contamination of the waste since the recovered protein is to be used for feed, such as animal supplement feed, and, possibly for food for human consumption.

We have found that where wastes must be collected at points far distant from the recovery plant or held before processing for any length of time, that flooding with dilute (about 0.5%) aqueous sodium hydroxide is effective in preventing spoilage. The alkali used is not wasted since it can be used in the protein extraction.

The ground waste received at the processing recovery plant can be drained using screens or centrifuges with a final saveall screen for the finely divided particulate matter comprising shell and flesh. The effluent water should contain as little organic matter as possible to contaminate the local area.

One way of recovering the protein is to feed the solid waste continuously to a series of countercurrent vessels in which the protein is solubilized and extracted by the action of a dilute aqueous alkaline solution. The residence time in the extraction system would be compatible with the concentration of the alkaline solution, the temperature, and the particle size. These factors are adjusted to accomplish, substantially, complete protein removal from the shellfish waste and to yield an effluent liquor in which excess alkali is nearly completely consumed. An alkali proteinate concentration of 8%–10% is attained in the alkaline aqueous extract.

Since the protein extraction is most effectively conducted on small particles, and since true countercurrent flow between liquor and particles is difficult to achieve in a practical apparatus, the extraction is best conducted in a series of units in which concurrent flow of the shell-liquor slurry occurs in each stage followed by separation of liquid and solid and countercurrent passage of shell and liquor from stage to stage. In general, two or three stages are found adequate for the process.

We find that a temperature of about 150°–160° F. and a mean hydroxyl ion concentration of 0.05 to 0.2 molar (pH 12.4–12.8) will give substantially complete protein removal in 1.0 to 2.0 hours. Lower temperatures or alkalinities are very much less effective indicating an essential minimum energy level for bond rupture.

Addition of sodium sulfite at a level of about 0.1% to the aqueous extracting solution has been found to markedly increase extraction rates.

The overall requirement of alkali to dissolve shell protein as sodium proteinate is about 10 pounds of sodium hydroxide per 100 pounds of protein. With a six to one liquor to solids ratio, a final protein concentration in the sodium proteinate extract of about 6–8% can be attained. Residual protein solubility at the isoelectric point should not be greater than 0.3% so that about 95% protein recovery is achieved.

With some crustacea species relatively high fat contents occur in the waste. Fat is dispersed in the alkali protein extract, and if not otherwise removed, is precipitated along with the protein in neutralization. We have found that partial neutralization of the sodium proteinate extract to pH 8–9 facilitates fat removal by centrifugation. With some species, carotenoid pigments, astaxanthin, etc. are removed along with protein and dissolve in the fat phase. Addition of extra oil such as fish oil or vegetable oil before centrifugation aids in carotenoid recovery. Astaxanthin is a valuable by-product which is used in fish feeding to impart a pink coloration to the flesh. We have found that the partially neutralized protein at pH 8–9 is still fully soluble and does not start to precipitate until the isoelectric point (pH 3.5 to 4.5) is nearly attained.

Protein precipitation can be conducted continuously by adding streams of sodium proteinate liquor and dilute hydrochloric or sulfuric acid to an agitated slurry of protein at the isoelectric point. The rate of acid addition can be automatically controlled by a pH transducer in the protein slurry. The slurry is drawn off from the precipitation vessel continuously maintaining a desired liquid level and the protein is collected and washed in a filter press or a continuous centrifuge. We have found that where slight spoilage of shell before processing has occurred or if the alkali extraction of protein is too drastic, some hydrogen sulfide may be evolved during the neutralization. The neutralization vessel should therefore be equipped with a hood, exhaust fan and scrubber for evolved gases.

A portion of the total organic nitrogen in the isoelectric mother liquor is non-protein nitrogen representing metabolic products in the viscera and enzymatic degradation products. To minimize the amount of such material and thus the oxygen demand of the process effluent, it is essential that the shellfish waste be processed in strictly fresh condition avoiding bacterial growth and putrefaction.

There are a number of ways of processing the alkaline proteinate extracts. One way of processing the alkaline proteinate extract solution is to reduce the alkalinity by the addition of an acid, such as hydrochloric acid, to a pH 7. Then there is centrifugal clarification to remove fine suspended mineral matter, fiber and chitin. The resultant liquid is spray dried. Such a process yields an alkaline proteinate in the form of a light non-hygroscopic powder. This powder is readily redispersable and soluble in water. However, this powder can have a shellfish taste and odor and may contain lipid material, depending on the character of the waste. The powder is acceptable as an animal feed supplement containing 85%–90% protein, 8%–10% ash, and 1–3% moisture. An advantage of this process is that all of the protein is recovered. Aside from a small amount of suspended matter removed in the centrifugal clarification there is no residue.

Another way of processing is to refine the alkaline proteinate solution by use of solid adsorbents to remove lipids, or by extraction with organic solvents and then spray drying the liquid so as to yield an alkaline proteinate of a higher quality. There may be partial hydrolysis with tryptic enzymes to yield products for microbiological synthesis.

Another variation in the processing of the shellfish waste from crustacea for protein recovery is that the aqueous alkaline proteinate extract can be neutralized by an acid, such as hydrochloric acid, to a pH in the range of about 3.5 to 4.5, i.e., to the isoelectric point. The precipitated protein can be collected by filtration or centrifugal separation, washed, reslurried and spray dried to yield a pure protein product which may be applicable as a human food supplement. This shellfish waste protein from crustacea has an advantage over fish protein meal in that shellfish waste protein has a lower ash content, is free of fluorides, and offers refining possibilities in a liquid system.

In regard to the advantageous use of the shell from the shellfish waste of crustacea comprising a matrix of chitin and protein and calcium, there is left after the aqueous alkaline extraction of the protein from the shell, a combination of chitin and a mineral, a calcium compound such as calcium carbonate. The residue from the shell is primarily chitin and calcium carbonate in a matrix. As is recalled, the the residue at this time is in a small size in the range of 0.05"–0.15". The residue from the shell can be used directly as a soil conditioner or as a fertilizer. The calcium compounds, calcium carbonate, is equivalent to agriculture lime and the acids in the soil will break down the calcium carbonate to give the equivalent of lime. The chitin of the shell residue contains approximately 6.9% nitrogen. The soil organisms acting upon the chitin will release the nitrogen as a nitrogen supplement to the soil and therefore as a fertilizer. In other words, the shell residue gives the mineral calcium to the soil and also gives nitrogen to the soil as a fertilizer.

An alternative to using the residue from the shellfish waste conditioner is to heat and burn the residue to decompose the chitin and to leave calcium as calcium oxide or lime. In this way, there is a process for the production of lime from the residue. Again, the lime can be used as a soil conditioner. As an alternative to using the lime as a soil conditioner, the lime can be partially used in the plant for removal of carbonates from the alkaline hydroxide solution used in protein extraction. Normally, the aqueous alkaline hydroxide solution will be an aqueous sodium hydroxide solution or an aqueous potassium hydroxide solution. The addition of the lime to the sodium hydroxide solution or the alkaline hydroxide solution will ensure the removal of the carbonates in the solution so as to leave a pirer and stronger hydroxide solution.

Another alternative for processing the residue of shell from shellfish waste, i.e., chitin and calcium carbonate, is to further process the residue of shell by treatment with an acid to remove the calcium compound and to leave, substantially, only the chitin. The acid may be hydrochloric acid. There is produced a brine of calcium chloride. By this means, a brine of about 20% concentration of calcium chloride can be produced with, substantially, complete demineralization of the chitin. The demineralized chitin would be washed on a rotary vacuum filter and dried in a rotary drum-hot-air dryer. It can be marketed to secondary processors or converted, directly, without drying to valuable chitin derivatives such as chitosan. Possible uses for chitin and chitosan are in water purification. Chitin and chitosan are polyelectrolytes and can be used to remove impurities in water such as polyphenolic compounds, tannins and chemical compounds which make water hard. Further, chitin can be converted to soluble derivatives. From these soluble derivatives it is possible to make moisture-proof films and coatings, sizes for paper and textiles, coating for glass fibers to permit dying, coagulants for water and waste materials, oil well drilling additives, thickeners for foods, paints and inks, gels, ion exchange resins and films and encapsulation agents for pharmaceuticals.

The following examples will more particularly bring forth the invention and benefits flowing from the invention.

EXAMPLE I

The following procedure was devised to obtain comparable extraction rate data for protein from shell particles of crustacea comprising a matrix of protein and chitin and calcium chloride of different size distributions and different crustacea species using different extraction media and different reaction conditions. The rate at which protein concentration approaches an equilibrium value is followed in a batch treatment using an extracting medium of known composition and constant temperature. Calculation of rate constants assumes that the rate of change of protein concentration at the interface between shell particles of crustacea and ambient liquid is proportional to a driving force equal to the difference between protein concentration in shell interstices (Ps) and that at the interface (Pi)

$$\frac{dPi}{dt} = K (Ps - Pi),$$

wherein K is the proportionally constant. Further assumptions are that Pi is equal to the protein concentration in the ambient liquid and Ps is equal to the total unextracted protein dissolved in a constant interstitial volume equal to the water content of the moist shell. Values of Ps can thus be calculated from those for Pi and a rate constant can be obtained by graphical integration. It is equal to the slope of the line $$\log_e \frac{(Ps - Pi)}{Ps_o} = kt$$

This treatment of the diffusion process is a gross simplification of the actual situation which must involve many complex factors. We have found it useful however for comparative purposes.

To determine Pi at intervals during the extraction, small (1 ml) samples are withdrawn from the mixture using a screened pipet and are analyzed by a modification of the biuret reaction (1). A purple color is developed which can be measured with a photometer at 550 nanometers. A reference standard curve is prepared using known concentrations of extracted shell protein since colors are somewhat different for different proteins. A typical experiment was conducted as follows:

(1) Technicon Method File No. N-14b, Technicon Corporation, Tarrytown, New York (1967).

Ground shrimp shell (0.05" average particle diameter) 100 grams are suspended in 900 ml of distilled water in a 1500 ml beaker equipped with a mechanical stirrer. The mixture was heated to 60° C. and held at this temperature throughout the experiment. 100 ml of 10% aqueous sodium hydroxide solution was preheated at 60° C. and at "zero" time was added to the shell suspension. Samples were withdrawn at two minute intervals up to 29 minutes and a final sample at 60 minutes was analyzed by both biuret and Kjeldahl procedures for standarization. Results and calculations are shown in the following Table I.

The second column of the table shows optical density values obtained in the biuret reaction. A smooth curve is drawn through these values and values from the curve are converted to Pi using Beer's law and the protein value obtained by Kjeldahl analysis on the 60-minute sample. In column 4 Pi values are multiplied by the volume ratio Va/Vi where Va is the volume of ambient liquid and Vi is the volume of interstitial liquid, respectively. This column represents the equivalent concentration of extracted protein if it were all contained in the interstitial liquid. Column 5, Ps is obtained by subtracting column 4 from $Ps_o$, the original protein content of the shell assumed to be dissolved in the interstitial liquid. Column 6 then represents the percentage deviation from equilibrium and column 7 the logarithms of values in column 6.

When values in column 7 are plotted against time, a curve is obtained which can be closely represented by two straight lines of different slope, the first line indicating much more rapid extraction than the second and probably representing protein on or near the surface of the particles. If the second line is extrapolated to zero time, a value of $(Ps_o 1 Pi)/Ps_o$ of about 60 percent is found. Thus, about 40% of the protein can be rapidly extracted and the remaining 60% in much more slowly removed.

When shell from different crustacea species is extracted by the above procedure using different average particle sizes, different alkali concentrations and temperature variations (see FIG. 1) the following conclusions may be drawn.

1. More highly mineralized shell such as Dungeness crab (Cancer magister) and Tanner crab (Chionoecetes oplilio) are much more slowly extracted than softer shelled species such as various shrimp species and King crab (Paralithodes camtschatica).

2. The amount of readily extractable protein is nearly the same for all species studied, i.e., about 40%–50%.

3. Temperature effects on extraction rate are considerably higher (about a 3.5 fold increase per 10 degree centigrade rise) than could reasonably be explained by increased diffusion rate (about 2% per degree). This is believed to indicate an activation energy requirement for bond rupture between protein and chitin.

4. Alkali concentration in an aqueous solution above a certain limiting value does not effectively increase the extraction rate. A pH value of about 12.4 corresponding to about 0.25% active sodium hydroxide appears to be necessary to liberate and dissolve the shell protein. This is contrary to assumptions of Trim and Lafon (Loc. Cit.) who used 5% sodium hydroxide to remove the more difficulty soluble protein. Trim[R] felt that the linkages between protein and chitin were at least as strong as those between the amino acids of the protein. Our results indicate that the bond, while real, is of a weaker nature such as hydrogen bonding or other secondary valence type.

Sodium carbonate in an aqueous solution at a level of about 5% was found ineffective as an extraction agent.
(R) Trim, A.R. Loc. Cit. p. 1094

5. Small particle size increases extraction rate in roughly inverse ratio to the mean particle diameter.

6. Addition of sodium sulfite to the extracting medium at a level of 0.1% markedly increases extraction rates. The reason for this has not been clearly established. It may be due to rupture of disulfide cross linkages between polypeptide chains or to rupture of hydrogen bonds between protein and chitin.

TABLE IV

Extraction of Shrimp Shell With 1% NaOH at 60° C.

| Time Minutes | Buiret Test O.D. | $P_i$ g/L | $P_i \dfrac{V_a}{V_i}$ g/L | $P_s$ g/L | $100 \dfrac{P_s - P_i}{P_{s_0}}$ | $Log_{10}$ |
|---|---|---|---|---|---|---|
| 1  | 0.077 | 2.50  | 46.7  | 220.3 | 81.7  | 1.912 |
| 3  | 0.167 | 5.75  | 95.9  | 173.1 | 61.9  | 1.792 |
| 5  | 0.234 | 7.96  | 132.8 | 134.2 | 47.4  | 1.676 |
| 7  | 0.284 | 9.45  | 157.7 | 99.3  | 37.4  | 1.573 |
| 9  | 0.305 | 10.50 | 175.0 | 92.0  | 30.5  | 1.484 |
| 11 | 0.325 | 11.10 | 185.0 | 82.0  | 26.9  | 1.430 |
| 13 | 0.345 | 11.90 | 198.5 | 68.5  | 21.2  | 1.326 |
| 15 | 0.355 | 12.30 | 205.0 | 62.0  | 18.5  | 1.267 |
| 17 | 0.380 | 12.60 | 210.0 | 57.0  | 16.6  | 1.220 |
| 19 | 0.381 | 12.90 | 215.0 | 52.0  | 14.7  | 1.167 |
| 21 | 0.380 | 13.15 | 219.0 | 48.0  | 13.1  | 1.117 |
| 23 | 0.385 | 13.30 | 222.0 | 45.0  | 11.9  | 1.075 |
| 25 | 0.385 | 13.50 | 225.0 | 42.0  | 10.7  | 1.030 |
| 27 | 0.402 | 13.70 | 228.0 | 39.0  | 9.48  | 0.977 |
| 29 | 0.426 | 13.85 | 231.0 | 36.0  | 8.30  | 0.919 |
| 60 | 0.440 | 14.95 | 249.0 | 18.0  | 1.14  | 0.056 |

EXAMPLE II

Figure 2:
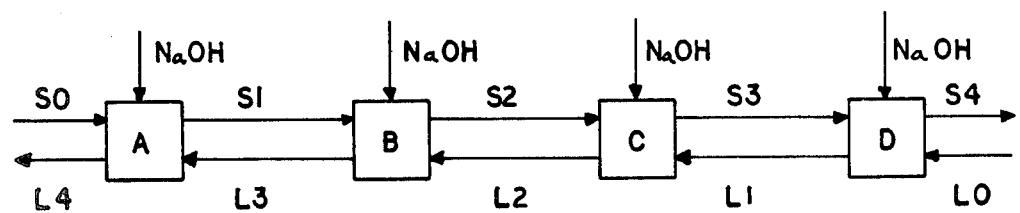
FIG. 2 is a four-stage representation of the extraction process.

With reference to this example, see FIG. 2. A quantity (30 pounds) of shrimp waste containing 35% solids and 40.2% protein on a dry basis was ground to a mean particle diameter of about 0.1 inch and charged to the first of four rotary mixers (Mixer A). Fifty pounds of 1.0% aqueous sodium hydroxide solution was added and the mixture was heated to 60° C. and maintained at this temperature for 30 minutes. It was then drained on a 60 mesh screen removing additional liquor in a centrifuge to a solids content of about 35% for the partially extracted shell. The shell was added to Mixer B and was re-extracted as above with 50 pounds of 1% aqueous sodium hydroxide solution. A fresh charge of shell and the liquor from the first extraction fortified with 0.25 pounds of sodium hydroxide was placed in Mixer A and Mixers A and B were operated at 60° C. for 30 minutes.

The extraction process was continued adding fresh shell to Mixer A and water to Mixer D, advancing shell from A to B to C to D and liquor from D to C to B to A with sodium hydroxide additions between stages to maintain a free hydroxyl ion concentration of about 0.05 molar and to supply sufficient total sodium hydroxide to dissolve all of the protein in the shell of shrimp, viz., a matrix comprising chitin and protein as sodium proteinate (about 10% of the protein weight). After one or two extractions with all four units, a substantially steady state was attained. Sodium proteinate liquor from Mixer A was thereafter collected for protein recovery and extracted shell from Mixer D was collected for transfer to a demineralization process. The four stage countercurrent extraction can be represented as in FIG. 2 in which S0, S1, S2, S3 and S4 represent the shell and L0, L1, L2, L3, and L4 the liquor at different points in the process. Typical analysis for liquor and shell at the several points are shown in Table V.

In Example II, alkali is added in each stage of the extraction in amounts just sufficient to dissolve the protein as sodium proteinate and to provide the small excess of free hydroxyl ion necessary to obtain a satisfactory extraction rate. Table V shows that most of the portein is extracted in Stages A and B and that most of the alkali is added in these stages. By apportioning the alkali in this manner the harmful effects of high alkali concentration can be avoided and the time of exposure of most of the protein to alkali is minimized.

Figure 3:
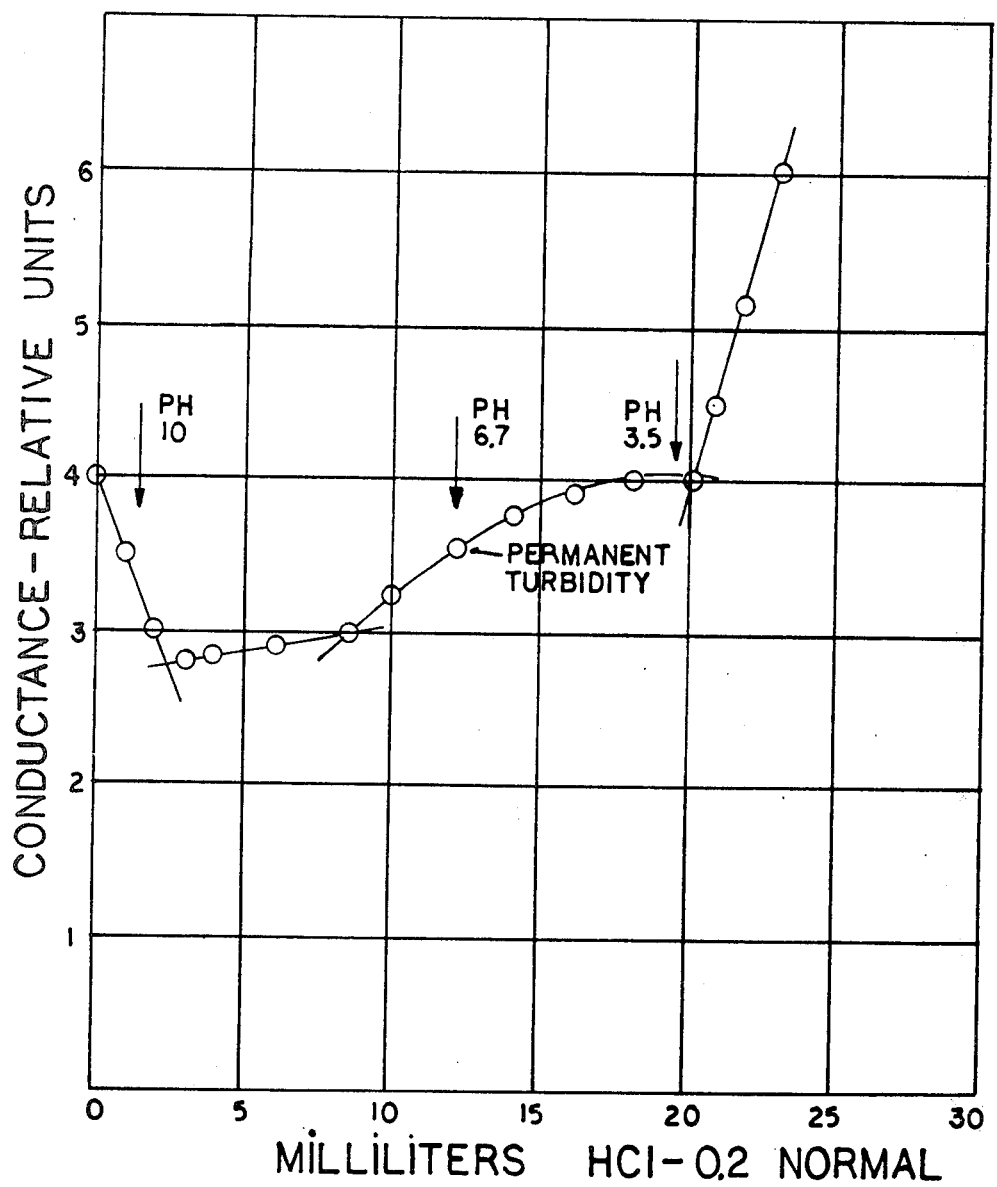
FIG. 3 is a graph and is entitled "Conductimetric Titration of Sodium Proteinate Liquor"; and, FIG. 4 is a flow sheet of the process for extracting proteins from the waste of crustacea or the shell of crustacea.

FIG. 3 shows results of a conductimetric titration of a sodium proteinate extract as obtained in Example 2. The portion of the titration curve at the left of the figure shows a high negative slope due to the neutralization of hydroxyl ions. This portion consumes little acid since only a slight excess of hydroxyl ions is present. Neutralization of hydroxyl ions is complete at about pH 10. The conversion of sodium proteinate to free protein and sodium chloride extends over most of the titration and appears to occur in two stages, the first with little change in conductance and the second with a rise in conductance. Actual precipitation of protein does not occur until the pH falls to about 6.5. The final portion of the curve with steep rise in conductance represents the addition of excess acid. It starts at about pH 3.5. This value may not coincide exactly with the pH for minimum protein solubility.

This titration shows that only a very small portion of the alkali used is present in the liquor as free hydroxyl ion and that the major portion of the alkali, perhaps 95%, is present as a weak acid salt, sodium proteinate.

Table V

Point Analyses of Liquor and Shell in a Four Stage Extraction Process

| Sample | S0 | S1 | S2 | S3 | S4 |
|---|---|---|---|---|---|
| % protein, dry basis | 40.2 | 32.2 | 18.5 | 5.85 | 0.5 |
| Lbs. shell, dry basis | 10.5 | 7.87 | 6.80 | 6.49 | 6.32 |
| Lbs. Protein, dry basis | 4.21 | 2.52 | 1.26 | 0.38 | .032 |
| Lbs. moist shell | 30.0 | 25.2 | 21.5 | 19.0 | 18.0 |

| Sample | L4 | L3 | L2 | L1 | L0 |
|---|---|---|---|---|---|
| Lbs. Protein in liquor | 4.18 | 2.49 | 1.23 | 0.35 | 0.0 |
| Lbs. Liquor | 53. | 39.75 | 29.75 | 22.85 | 20.0 |
| % protein in liquor | 7.88 | 6.23 | 4.13 | 1.53 | 0.0 |

| Stage | A | B | C | D |
|---|---|---|---|---|
| Lbs. 2% NaOH | 8.45 | 6.30 | 4.40 | 1.85 |

EXAMPLE III

A quantity (100 pounds) of sodium proteinate liquor as produced in Example 2 was placed in a 30 gallon plastic vessel fitted with a mechanical stirrer. Dilute sulfuric acid was added in a fine stream to the agitated liquor to a pH level of about 8. At this point portein is still soluble in the extract liquor. About 3.9 pounds of sulfuric acid (100% basis) was required.

Cottonseed oil (10 pounds) was intimately mixed with the partially neutralized sodium proteinate liquor and the mixture was then passed through a high speed centrifugal separator. A red-orange oil phase and an aqueous phase showing less color and suspended matter were obtained.

The partially neutralized and clarified sodium proteinate liquor was collected in a second plastic vessel and dilute sulfuric acid (6 pounds, 100% basis) was added with continuous agitation to the pH of minimum protein solubility. This was about 4.0, but may vary from 4.5 to 3.5 depending on crustacea species and conditions of extraction. The protein precipitate was collected in a centrifuge and washed with water to reduce the ash content to about 1% in a wet cake (5% on a dry basis). The protein cake was reslurried in water and spray dried yielding 7.5 pounds of a light tan powder. Analysis showed 90% protein, 5% water and 5% ash.

Protein precipitation, collection, washing and drying can be conducted as a series of batch operations or as a continuous process as desired. Various types of equipment for extraction, collection and drying may be used.

The protein obtained as in Example III was analyzed to determine its amino acid content and feeding tests on rats were conducted by a standard procedure.[2]
[2] AOAC Methods of Analysis, Method 39.166, 11th edition, 1970.

Results of amino acid analyses for protein extracted from crab and shrimp shells in comparison with casein are shown in Table VI. Both crustacea shell proteins compare very favorably with casein with respect to the content of essential amino acids.

Feeding tests with both crustacea products as the sole source of protein show a deficiency in sulfur containing amino acids but when either cystine or methionine was added at a level of 0.5% growth rates for rats were equal to those obtained with casein as the sole source of protein. No toxic effects were detected in the test animals after four weeks on the crustacea protein diet.

TABLE VI

| | Amino Acid Composition of Spray Dried Shellfish Waste Proteins | | |
|---|---|---|---|
| Sample | Dungeness Crab 100% protein Basis % | Shrimp 100% protein Basis % | Casein 100% protein Basis % |
| Lysine* | 6.35 | 8.34 | 6.02 |
| Histidine* | 2.60 | 2.97 | 2.31 |
| Arginine* | 6.47 | 8.06 | 2.41 |
| Aspartic acid | 12.1 | 8.63 | 4.45 |
| Threonine* | 4.20 | 3.91 | 3.81 |
| Serine | 3.18 | 4.69 | 5.88 |
| Glutamic acid | 14.5 | 17.8 | 21.9 |
| Proline | 5.10 | 4.54 | 15.71 |
| Glycine | 4.94 | 7.52 | 1.16 |
| Alanine | 5.41 | 7.14 | 1.47 |
| Cystine | 0.28 | — | not determined |
| Valine* | 6.47 | 5.62 | 7.91 |
| Methionine* | 2.32 | 2.60 | 2.75 |
| Isoleucine* | 5.53 | 5.17 | 3.91 |
| Leucine* | 7.78 | 8.14 | 11.07 |
| Tyrosine | 4.70 | 3.61 | 2.72 |
| Phenylalanine* | 4.80 | 5.05 | 5.46 |
| Tryptophan* | 1.18 | 0.73 | 1.0 (approximately) |

*essential

EXAMPLE IV

A shellfish waste from the shell of crustacea, such as from King Crab or Tanner Crab, and comprising shell, visceral protein, blood and the like and visceral meat, or other suitable shellfish waste, is wet ground in a hammer mill to a size less than, approximately, ⅛ inch size so as to increase the bulk density and facilitate extraction of the protein from the shell of crustacea. This shellfish waste is then washed to separate visceral protein, blood and the like such as visceral meat from the shell. Then, to extract the protein from this ground shellfish waste, the waste is extracted, by a countercurrent flow of aqueous sodium hydroxide solution. The sodium hydroxide solution contains total alkali equal to about 6% of the protein but only 0.5% or less of active hydroxide at any one time. The temperature of the shell of crustacea is maintained below approximately, 180° F. In this extraction, the temperature was maintained in the range of 175° F.–180° F. for one hour. With the extraction of the protein by aqueous sodium hydroxide, there is formed a soluble sodium proteinate. The shell of the shellfish waste may be more thoroughly separated by centrifuging the shell so as to remove the sodium hydroxide solution. Then, to the alkaline extract of the sodium proteinate in the aqueous solution there is added a mineral acid to lower the pH of the solution to a pH less than 5. The pH of the proteinate solution is decreased to a value in the range of pH 3.5 to pH 4.5. Preferably, the pH of the sodium proteinate solution is reduced to a pH of the isoelectric point of the solution, i.e., about 4.0. The sodium proteinate solution at pH 7.0 or the precipitated protein may be spray dried to form a solid protein. The spray drying should be done at a temperature so that the protein will not be at a temperature greater than 180° F. and, preferably, less than 175° F.

At this stage of the process, there is a protein which can be added as a supplement to animal feed. Also, there is a shell residue or a residue of shell comprising, essentially, chitin and calcium carbonate, which can be used in its present state as a soil conditioner. More, particularly, the residue of shell can be worked into the soil, and the calcium in the combination of chitin and calcium compound will react with the acids in the soil and work into the soil. The chitin in the residue of shell will react with the organisms of the soil and decompose, slowly, to give nitrogen. In other words, the chitin can be used as a fertilizer to release nitrogen, slowly, into the soil and thereby over a, relatively, long period of time increase the nigrogen content of the soil.

If, instead of using the residue of shell as a soil conditioner it is possible to heat and to burn the residue of shell to get rid of the chitin and to convert the calcium carbonate of the shell residue to lime.

Also, it is possible to contact the residue of shell with hydrochloric acid to form a brine of calcium chloride. More particularly, the shell residue may be contacted with a calcium chloride brine comprising approximately 20% by weight of calcium chloride and about 5% by weight of hydrochloric acid. The temperature of the brine is 80° F. and the time of contact is about one hour. The combination of shell comprising chitin and a calcium compound is contacted with the calcium chloride brine in a countercurrent extraction step. The resulting brine is at a concentration of about 25% by weight of calcium chloride. There also results chitin.

The brine of calcium chloride can be dried to give calcium chloride or else the brine can be spread onto dusty roads and onto dusty places to function as a hydroscopic agent for drawing moisture from the atmosphere to lessen the dust from dusty roads. The chitin can be used as a water treating agent and as a starting agent or a starting reactant for preparing other chemicals, as, previously, explained.

EXAMPLE V

The steps of Example IV can be substantially completed except there may be used a 1% aqueous sodium hydroxide solution at a temperature of 150° F. for three hours. The shellfish waste of crustacea, such as King crab or Tanner crab, is again wet ground to a size less than about ⅛ inch so as to increase the bulk density. This shellfish waste is then washed to separate visceral protein, blood and the like such as visceral meat from the shell. Then, by a countercurrent extraction, the shellfish waste may be contacted with an aqueous 1% sodium hydroxide solution at a temperature of about 150° F. for three hours to solubilize the protein in the shellfish waste. The active sodium hydroxide is about 0.5%, based on the protein, is present in the mixture of the shell and sodium hydroxide. This step forms soluble sodium proteinate. The shell may be separated from the soluble proteinate by a centrifuging step. Then, there is added hydrochloric acid to the soluble sodium proteinate solution to decrease the pH to a pH in the range of about pH 3.5 to about 4.5, preferably, near the isoelectric point of pH about 4.0. The precipitated protein is separated from the solution and spray dried to form a solid protein which can be used as a protein supplement for animal feed. This leaves the residue of shell comprising the combination of chitin and a calcium compound such as calcium carbonate. Then, the shell residue is contacted, in a countercurrent extraction, with a calcium chloride brine comprising about 20% calcium chloride and 5% hydrochloric acid for 16 hours at a temperature about 50° F. so as to produce chitin and calcium chloride.

The use of the calcium chloride, the chitin and the combination of the chitin and the calcium compound has previously been explained.

EXAMPLE VI

In another process, the shellfish waste from crustacea, such as King Crab or Tanner crab or shrimp or crayfish, is ground in a wet process and in a hammer mill to form a shellfish waste having a particle size less than about ⅛ inch in diameter and also to increase the bulk density. This shellfish waste from crustacea is then washed to separate visceral protein, blood and the like such as visceral meat from the combination of shell and protein. The shell of crustacea is dried at a temperature less than about 185° F. The shellfish waste comprising, mainly, shell is dried in a rotating cylindrical dryer with an inlet air temperature not over 400° F. The maximum product temperature is less than 185° F. The dried shellfish waste or dried shell is contacted with a brine comprising calcium chloride, approximately 20% by weight of calcium chloride, and hydrochloric acid, approximately 5% by weight of hydrochloric acid. For a period of 8 hours at 60° F. the shell is contacted with the calcium chloride brine in a countercurrent extraction step. The hydrochloric acid reacts with calcium compounds of the shell to form calcium chloride. In the formation of the calcium chloride, the shell is demineralized. The brine of calcium chloride and hydrochloric acid, mainly calcium chloride, is separated from the residue of shell comprising chitin and protein. Then, the residue of shell is washed to free it from any hydrochloric acid.

The residue of shell is then processed by a countercurrent extraction with an aqueous potassium hydroxide solution to remove the protein and to leave the chitin. The aqueous potassium hydroxide solution is at a concentration of about 1% by weight of potassium hydroxide. The active potassium hydroxide is about 0.5%, based on the protein, is present in the mixture of shell and potassium hydroxide. The contact time between the potassium hydroxide solution and the residue of shell and protein is about two hours and at a temperature of about 150° F. The aqueous alkaline extract from the residue of shell is separated from the residue of shell, viz., mainly, chitin. This separation may be accomplished by a centrifugal step, and the protein is precipitated from the solution by the addition of hydrochloric acid to lower the pH to a pH in the range of pH 4 to pH 5. Preferably, the pH is near the pH of the isoelectric point, about 4.5. The precipitated protein is separated from the aqueous supernatant liquid. One way of separation is by centrifuging the mixture. Then, the precipitated or separated protein is dried in a spray dryer at a temperature less than about 185° F. The incoming temperature of the hot air is less than about 400° F. and the temperature of the product or the protein is not allowed to rise above about 185° F. The protein which results from the spray drying is suitable for addition to feed for animals or may be used as a protein supplement for feed to animals.

There remains the chitin from the protein extraction step. This chitin is washed with water and then dried. The temperature of the chitin is not allowed to rise above approximately 185° F. and the drying step is so conducted that the inlet drying air is not above approximately 400° F. The chitin may be used as previously explained.

It is seen that the process of Example VI differs from Examples IV and V in that in Example VI the protein and shell combination is contacted with hydrochloric acid to form calcium chloride so as to leave a residue of shell comprising chitin and protein. Then, the protein is separated from the residue of shell by an alkaline extraction step. There are three basic products in the process of Example VI. These three products are a calcium chloride, a protein and a chitin.

In the process of Examples IV and V, the shell of crustacea is contacted with an aqueous alkaline solution to extract the protein. Then, the aqueous alkaline extract is separated from the residue of shell which comprises a combination of chitin and a calcium compound such as calcium carbonate. The protein from the shell of crustacea can be separated from the aqueous alkaline proteinate solution. Then, the residue of shell comprising chitin and the calcium compound are contacted with hydrochloric acid to form a calcium chloride brine and to form chitin. The products of the process of Examples IV and V are a protein, and may be chitin or lime or calcium chloride or a combination of chitin and calcium carbonate.

Figure 4:
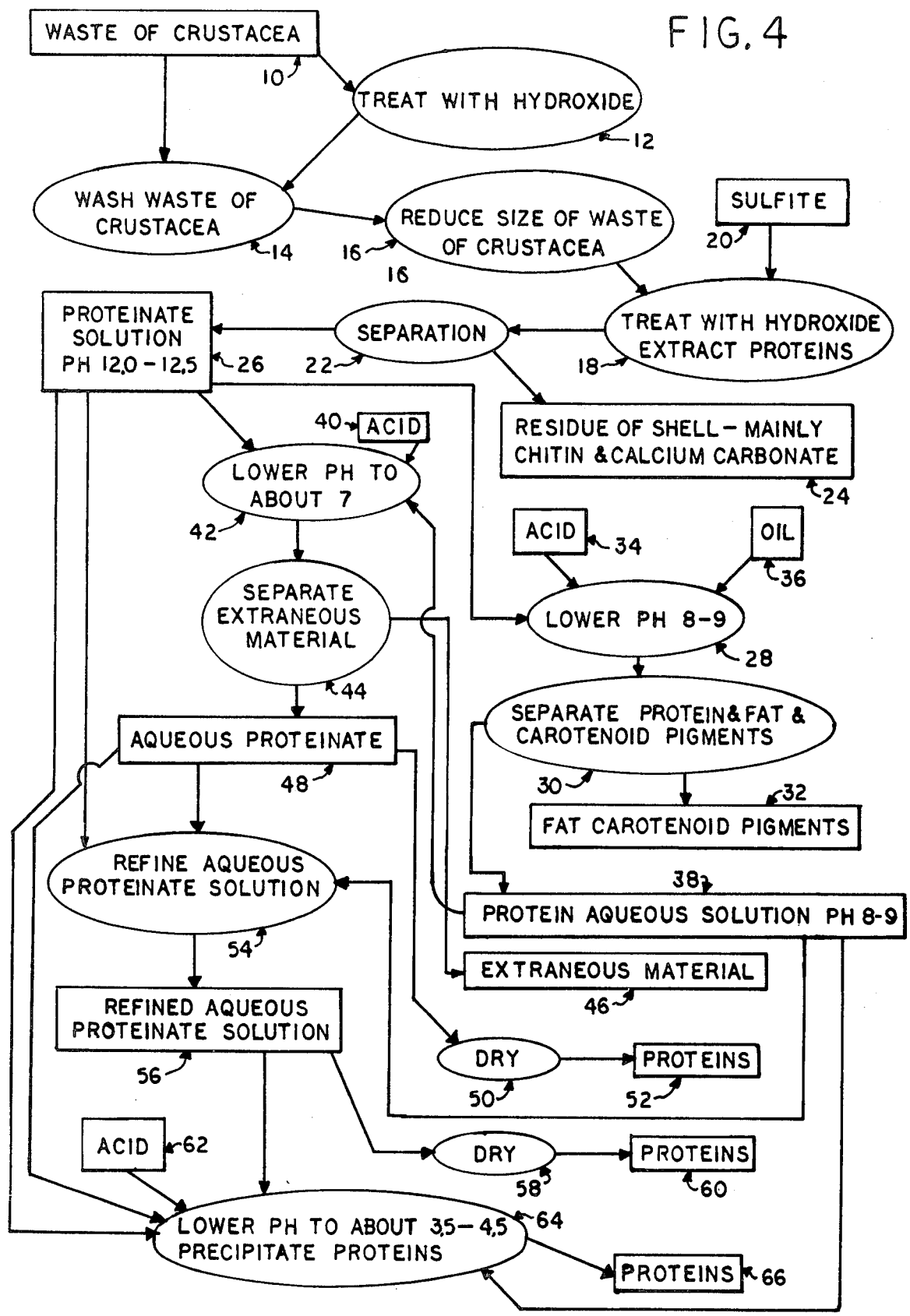

In FIG. 4, there is a flow sheet illustrating the extraction of proteins from the waste of crustacea or the shell of crustacea.

The waste of crustacea can be treated with an aqueous hydroxide solution at step 12 to assist in preventing spoilage. The treatment with a hydroxide may be with a weak aqueous solution of an alkali metal hydroxide such as sodium hydroxide or potassium hydroxide, about 0.5% by weight of the alkali metal hydroxide. We have found that treatment with the aqueous hydroxide is effective in preventing spoilage of the waste of crustacea before the waste of crustacea can be treated to remove the proteins from the matrix of protein and chitin and calcium carbonate. In other words, the waste of crustacea can be treated with the dilute alkali metal hydroxide aqueous solution and then transported to the main treatment plant or stored for treatment, without noticeable spoilage of the shell of crustacea.

The waste of crustacea, without treatment with the dilute hydroxide solution or after treatment with the dilute hydroxide solution, is washed at 14 to remove extraneous matters such as flesh, visceral protein, blood, and the like. In other words, at step 14, the waste of crustacea or shell of crustacea is washed to leave, substantially, only the shell of crustacea.

At step 16, the washed shell of crustacea is reduced in size so as to be in the size in the range of about 0.05" to 0.15". The reduction in size increases the bulk density of the shell of crustacea and also facilitates the extraction of protein, by an aqueous hydroxide solution, from the matrix of the protein and chitin and calcium carbonate. The size of the shell of crustacea can be reduced by one of many grinding means, such as a hammer mill, or a ball mill, or a grinder.

At step 18, the shell of crustacea from step 16, can be treated with an aqueous hydroxide solution such as aqueous sodium hydroxide or aqueous potassium hydroxide to remove the protein from the shell and to leave a residue such as chitin and a calcium compound such as calcium carbonate. The strength of the aqueous hydroxide solution may vary. We have found that one way of extracting the protein from the shell of crustacea is to have the concentration of the alkali hydroxide vary from about 0.2 to 0.3 molar and the temperature to vary from about 150° F. to about 170° F. The pH of the mixture of the aqueous hydroxide solution and the shell of crustacea is in the range from about 12.4 to about 12.7. The time of treatment of the shell of crustacea with the aqueous hydroxide solution can vary from about 30 minutes to 2½ to 3 hours. In certain treatments, the aqueous hydroxide solution can contain about 1.0% by weight of the alkali metal hydroxide. Another way of treating the shell of crustacea in step 18 is to incrementally add the aqueous alkali metal hydroxide, incrementally, to have a mixture of the hydroxide solution and the shell of crustacea and which mixture is about 0.2 to 0.3 molar with respect to the active hydroxyl ion. In other words, the concentration of the hydroxyl ion is maintained, substantially, uniform in step 18 so as to extract the protein from the shell of crustacea without damaging the protein and reducing the chain length of protein to polypeptides and the like and also without damaging the protein or altering the protein in the shell of crustacea. The pH of the aqueous mixture of the alkali metal hydroxide and the shell of crustacea is in the range of about 12.4 to about 12.7.

We have found that in step 18 that the addition of the sulfite ion makes it possible to more readily extract the protein from the shell of crustacea. We do not know the reason for this increase in the extraction of the protein from the shell of crustacea by the sulfite ion. The sulfite ion may be added as a salt with sodium sulfite or potassium sulfite.

At step 22, the aqueous solution is separated from solid so as to have a solid 24 which is the residue of shell of crustacea, namely, chitin and calcium compound such as calcium carbonate and also to have a proteinate solution 26.

The proteinate solution 26 has a pH in the range of about 12.0 to 12.5. The proteinate solution 26 may be treated in a number of ways. For example, at step 28, the pH of the proteinate sulution 26 may be lowered by the addition of an acid such as sulfuric acid or hydrochloric acid to a pH in the range of about 8 to 9. With this pH range, the fat in the proteinate solution is no longer soluble and can be separated by a centrifugal operation or by a centrifuge at step 30 to form the separated fat 32 and carotenoid pigments such as astaxanthin. The acid 34 for treating the proteinate solution 26, as previously stated, may be hydrochloric acid or sulfuric acid, or any other suitable acid to lower the pH to a range of about 8 to 9.

We have also found that that fat and carotenoid pigments can be removed more readily if an oil is added at step 28, the oil 36 may be vegetable oil, such as cottonseed oil or may be fish oil. Again, the fat and carotenoid pigments may be separated at step 30 to form a separate mixture of oil and fat and carotenoid pigments at 32. From step 30, the aqueous alkaline protein solution 38 is formed, having a pH in the range of about 8 to 9.

The aqueous protein solution 38 or the aqueous protein solution 26 can be treated with an acid 40 to lower the pH to a range of about 7 at step 42.

At step 44, the proteinate solution of a pH of about 7 can be centrifuged to remove extraneous material 46, such as fine suspended mineral matter, fiber, and chitin and to produce an aqueous proteinate solution 48. The aqueous proteinate solution 48 can be dried at step 50 to produce protein 52.

The aqueous proteinate solution 48 or the proteinate solution 26 can be refined at step 54 by use of sawdust adsorbents to remove lipids or by extraction with organic solvents to remove lipids to form the refined aqueous proteinate solution 56. The refined aqueous proteinate solution 56 may be dried at step 50 to produce protein 60.

The aqueous proteinate solution 48, with a pH of about 7, or the refined aqueous proteinate solution 56, with a pH of about 7, or the proteinate solution 26, with a pH of about 12.0 to 12.5, may be treated with an acid 62 at step 64 to lower the pH to the range of about 3.5 to about 4.5, the isoelectric point range, to precipitate protein 66.

The acid 62 may be hydrochloric acid, sulfuric acid or any other suitable acid to lower the pH to a range of about 3.5 to 4.5 to precipitate the protein 66. The protein 66 may be dried, such as by spray drying or air drying a vacuum drying, to form a product which can be fed to live stock or added as a supplement to livestock feed, or, in certain instances, may be suitable for human consumption. It is to be realized that the protein 66 will vary with the source of the shell of crustacea. For example, the amino acid composition of spray dried shellfish waste protein, see TABLE VI, varies with the source of the shell of crustacea. Likewise, the protein 52 and the protein 66 will vary with the source of the shell of crustacea and will also vary from each other and from the proteins 66 because of the different processing steps.

It is seen that in this invention we have provided a method for salvaging from a waste material, viz., the shell of crustacea, many useful chemicals such as chitin and protein and calcium.

It is to be realized that the protein which is salvaged is not one single protein but is a mixture of proteins. For example, in Table VI, it is seen that there is presented the proteins recovered from various shells of crustacea such as Dungeness crab and shrimp. The proteins recovered are identified and the approximate percentage is identified. In regard to the proteins alone, there are many various proteins or many chemicals.

Also, it is seen that in the chitin there is recovered a useful chemical.

Also, calcium is recovered in one form or another such as calcium chloride or if the shell of the crustacea comprising calcium and chitin is burned, the chitin is destroyed but there results calcium oxide or lime.

We think that this invention has value from the standpoint that we have made it possible to recover these many chemicals such as the proteins, chitin, and calcium and to be able to recover these chemicals economically.

From the foregoing and having presented our invention, what we claim is:

1. A process for recovering chemicals from waste of crustacea comprising shell of crustacea and which shell comprises bound chitin and bound protein and calcium carbonate, said process comprises:
   a. treating the waste of crustacea with an alkaline solution having a molarity of hydroxyl ion in the range of about 0.05 M to, approximately, 0.3 M and at a temperature in the range of about 140° F. to, approximately, 180° F., to remove the bound protein from the shell and to form an alkaline extract comprising said protein and to form a residue of shell comprising chitin and a calcium compound;
   b. separating said alkaline extract from said residue of shell;
   c. treating said alkaline extract to recover said protein; and,
   d. treating said residue of shell to recover said chitin and to recover said calcium.

2. A process according to claim 1, and comprising:
   a. in treating said residue of shell to recover said chitin subjecting said residue of shell to an acid to remove the calcium carbonate from the chitin;
   b. neutralizing said alkaline extract with an acid to a pH less than about 5.5 to form an acidic mixture and to precipitate said protein and to form a supernatant acidic extract; and,
   c. separating said protein from said supernatant acidic extract.

3. A process according to claim 1, and comprising:
   a. in treating said residue of shell subjecting said residue of shell to acid to remove the calcium in an aqueous solution from said chitin; and,
   b. drying said aqueous solution to leave the calcium.

4. A process according to claim 1, and comprising:
   a. subjecting said residue of shell to hydrochloric acid to form an aqueous solution comprising calcium and to remove said calcium from the chitin; and,
   b. separating said aqueous solution comprising calcium from the chitin to have said aqueous solution comprising calcium and said chitin.

5. A process according to claim 4, and comprising:
   a. drying said aqueous solution to leave the calcium.

6. A process according to claim 4, and comprising:
   a. drying said chitin to form a dry chitin and in drying said chitin maintaining the temperature of the chitin at a temperature less than about 185° F.

7. A process according to claim 4, and comprising:
   a. said alkaline solution comprising an alkali metal.

8. A process according to claim 4, and comprising:
   a. said alkaline solution comprising sodium.

9. A process according to claim 4, and comprising:
   a. said alkaline solution comprising potassium.

10. A process according to claim 4, and comprising:
    a. neutralizing said alkaline extract with an acid to a pH in the range of about 3.5 to, approximately, 5.5 to form an acidic mixture and to precipitate said protein and to form a supernatant acidic extract; and,
    b. separating said protein from said supernatant acidic extract.

11. A process according to claim 8 and comprising:
    a. neutralizing said alkaline extract with an acid to a pH in the range of about 3.5 to, approximately, 5.5 to form an acidic mixture and to precipitate said protein and to form a supernatant acidic extract; and,
    b. separating said protein from said supernatant acidic extract.

12. A process according to claim 9, and comprising:
    a. neutralizing said alkaline extract with an acid to a pH in the range of about 3.5 to, approximately, 5.5 to form an acidic mixture and to precipitate said protein and to form a supernatant acidic extract; and,
    b. separating said protein from said supernatant acidic extract.

13. A process for recovering chemicals from waste of crustacea comprising shell of crustacea and which shell comprises bound chitin and bound protein and calcium carbonate, said process comprises:
    a. treating the waste of crustacea with an acid to remove a calcium compound in an aqueous solution and to form a residue of shell comprising chitin and protein;
    b. treating the residue of shell with an alkaline solution having a molarity of hydroxyl ion in the range of about 0.05 to, approximately, 0.3 M and at a temperature in the range of about 140° F. to, approximately, 180° F., to form an alkaline extract comprising said protein;
    c. separating said alkaline extract from said chitin to leave said chitin; and,
    d. separating said protein from said alkaline extract.

14. A process according to claim 13, and comprising:
    a. treating said aqueous solution comprising said calcium compound to separate the calcium compound.

15. A process according to claim 13, and comprising:
    a. in separating said protein from said alkaline extract neutralizing said alkaline extract with an acid to form an aqueous solution containing protein; and,
    b. drying said aqueous solution containing protein to form said protein in a dry state and in drying the protein maintaining the temperature of the protein at a temperature less than about 185° F.

16. A process according to claim 13, and comprising:
    a. in separating said protein from said alkaline extract neutralizing said alkaline extract with an acid to a pH less than about 5.5 to form an acidic mixture and to precipitate said protein from said acidic mixture and to form a supernatant acidic extract; and,
b. separating said protein from said acidic mixture.

17. A process according to claim 13, and comprising:
a. drying said chitin to form a dry chitin.

18. A process according to claim 13, and comprising:
a. washing said chitin to purify said chitin; and,
b. drying said chitin to form a dry chitin and in drying said chitin maintaining the temperature of the chitin at a temperature less than about 185° F.

19. A process according to claim 13, and comprising:
a. treating the waste of crustacea with hydrochloric acid to form said aqueous solution comprising calcium and to remove said calcium from the shell of crustacea; and,
b. separating said aqueous solution comprising calcium from the residue of chitin and protein.

20. A process according to claim 19, and comprising:
a. drying said aqueous solution to leave the calcium as a salt.

21. A process according to claim 13, and comprising:
a. drying said chitin to form a dry chitin and in drying said chitin maintaining the temperature of the chitin at a temperature less than about 185° F.

22. A process according to claim 13, and comprising:
a. said alkaline solution comprising an alkali metal.

23. A process according to claim 22, and comprising:
a. said alkaline solution comprising sodium.

24. A process according to claim 22, and comprising:
a. said alkaline solution comprising potassium.

25. A process according to claim 22, and comprising:
a. neutralizing said alkaline extract with an acid to a pH in the range of about 3.5 to, approximately, 5.5 to form an acidic mixture and to precipitate said protein and to form a supernatant acidic extract; and,
b. separating said protein from said supernatant acidic extract.

26. A process according to claim 8, and comprising:
a. neutralizing said alkaline extract with an acid to a pH in the range of about 3.5 to, approximately, 5.5 to form an acidic mixture and to precipitate said protein and to form a supernatant acidic extract; and,
b. separating said protein from said supernatant acidic extract.

27. A process according to claim 9, and comprising:
a. neutralizing said alkaline extract with an acid to a pH in the range of about 3.5 to, approximately, 5.5 to form an acidic mixture and to precipitate said protein and to form a supernatant acidic extract; and,
b. separating said protein from said supernatant acidic extract.

* * * * *